May 8, 1951  F. E. ROACH ET AL  2,552,497
VARIABLE THROAT ROCKET NOZZLE
Filed Aug. 13, 1945
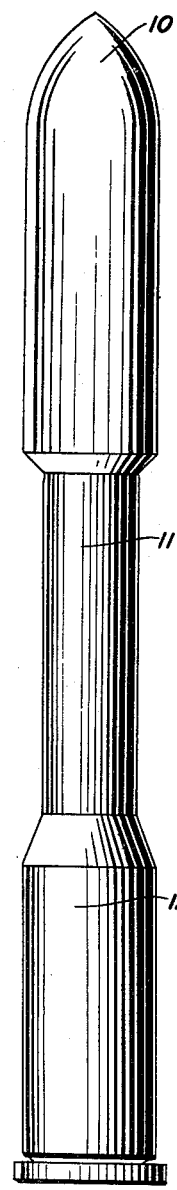
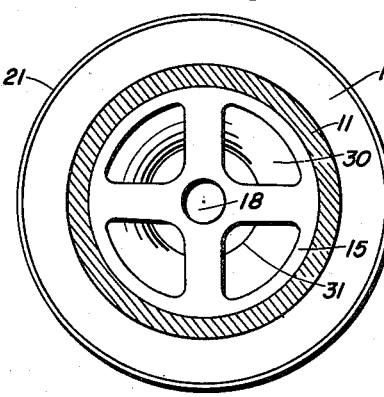
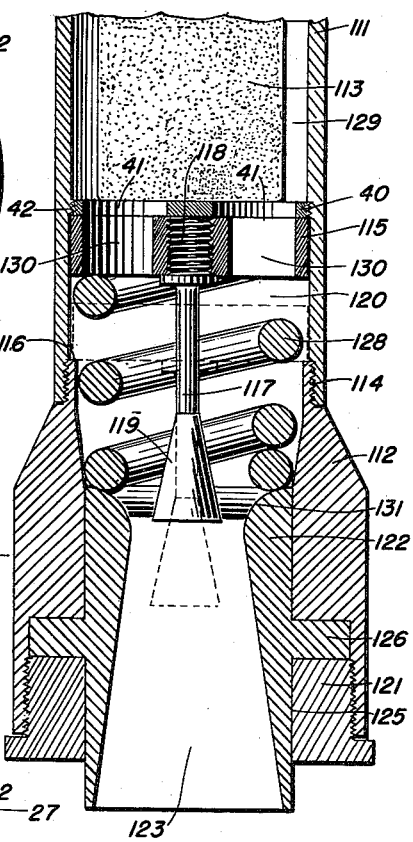
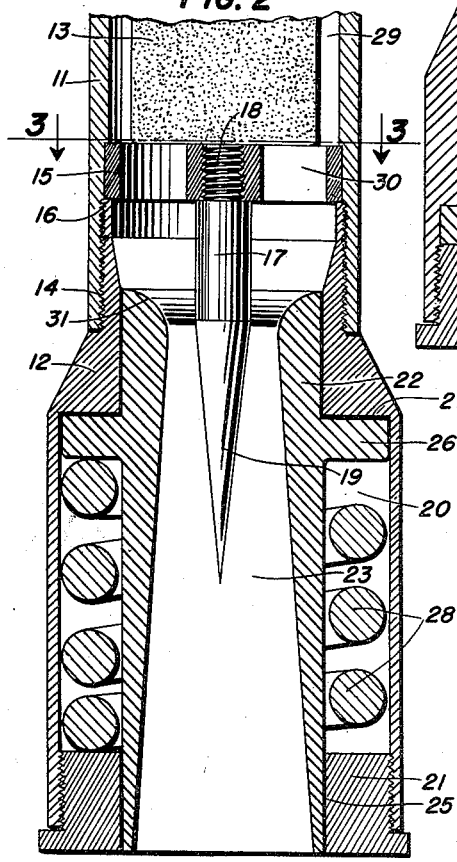
INVENTORS
FRANKLIN E. ROACH
OLIVER E. DUEMLER
BY
ATTORNEY

UNITED STATES PATENT OFFICE 2,552,497

VARIABLE THROAT ROCKET NOZZLE

Franklin E. Roach and Oliver Evans Duemler, Pasadena, Calif., assignors to the United States of America as represented by the Secretary of the Navy Application August 13, 1945, Serial No. 610,653

1 Claim. (Cl. 60—35.6)

This invention relates to rockets and has particular relation to a novel variable throat rocket nozzle for use with rocket motor tubes.

During burning of a propellent grain in a rocket motor tube, the generated gas pressure varies at different states of the burning. The generated gas pressure varies principally because of the construction and characteristics of the propellent grain and because of fissuring and breaking up of the propellent grain during deflagration. Thus, during periods of minimum pressure, the force of propulsion may be insufficient to maintain the rocket on its desired course; whereas during periods of maximum pressure, an excess quantity of gas pressure may be built up within the rocket motor tube due to its inability to escape through the exhaust nozzle, which may result in bursting of the motor tube or it may result in blowing the nozzle fixture from the motor tube.

An object of the present invention is to provide a variable throat rocket nozzle wherein the effective throat area of the nozzle varies directly in proportion to increases or decreases in gas pressures generated within the rocket motor tube by the burning of the propellent grain so as to compensate for and control such variations in pressure.

Another object of the invention is to provide a variable throat rocket nozzle which will materially increase the temperature range at which the rocket motor may be safely operated; that is, to provide a nozzle throat opening which may be automatically adjusted to the burning rate of the propellent grain, the throat enlarging at high temperatures within the motor tube to permit relief of the excess gas pressure and constricting at low temperatures within the motor tube to permit the generation of the desired gas pressure.

Still another object is to provide a variable throat rocket nozzle which will minimize the possibility of bursting of the rocket motor tube by relieving the pressure developed in the tube before it reaches dangerous values and utilizing the excess pressure to propel the rocket.

A further object is to provide a variable throat rocket nozzle which will tend to eliminate variations in trajectory of the rocket caused by differences in initial temperature and pressure developed on ignition of the propellent grain and the temperatures and pressures developed throughout the burning period.

These and other objects of the invention will be better understood by reference to the accompanying drawing in which:

Fig. 1 is a view in elevation of a complete rocket assembly embodying the invention;

Fig. 2 is a longitudinal sectional view of the after body of a rocket showing the exhaust portion of the motor tube and one form of the new variable throat rocket nozzle;

Fig. 3 is a cross-sectional view taken on the line 3—3 of Fig. 2, and

Fig. 4 is a longitudinal sectional view of a modified form of variable throat rocket nozzle made in accordance with the present invention.

The complete rocket assembly, as shown in Fig. 1, comprises a barrage or projectile body 10, a motor tube 11 and a nozzle housing 12 mounted at the exhaust end of the motor tube. The variable throat rocket nozzle, as shown in a preferred embodiment in Fig. 2, comprises a motor tube 11 having mounted therein a propellent grain 13 and having secured to its exhaust end a nozzle housing 12 which may be screw threaded into the interior of the motor tube, as shown at 14. A grain support spider or grid 15 is mounted in the tube against the shoulder 16 of the inner end of the nozzle housing. The grid 15 serves to support the grain 13 and prevents it from being blown out the nozzle upon ignition and during burning of the grain. A regulator cone 17 is mounted on the grid 15, as by means of a screw thread arrangement shown at 18. The regulator cone is provided with a tapered end portion 19 which projects into the nozzle bore 23. The extended exhaust portion of the nozzle housing 12 is provided with a counterbore forming a spring chamber 20 defined at its innerside by the nozzle 22 and at the exhaust end by the centering ring 21. The nozzle housing 12 is internally threaded at its exhaust end in order to receive a centering ring 21. A nozzle 22, in the form of a tube having a Venturi bore or chamber 23 is slidably supported by the inner wall of the nozzle housing 12 and by the inner wall 25 of the centering ring 21. The nozzle 22 is provided with an external flange 26 which extends into the spring chamber 20 and normally abuts a shoulder 27 formed by the inner end of the counterbore or spring chamber 20. A helical spring 28 is interposed between the flange 26 and the centering ring 21 in order to maintain the nozzle at its normal inner position, as shown in Fig. 2.

It will be noted that the effective nozzle throat area is defined by the tapered portion 19 of the cone 17 and by the minor diameter portion of the Venturi bore or nozzle chamber 23. Upon ignition of the propellent grain 13 in the motor tube 11, gas pressure is built up in the motor tube chamber 29 by burning of the propellent grain. This gas under pressure is exhausted through the ports 30 of the grid 15 and is exhausted through the area between the cone 19 and the minor diametered portion of the nozzle chamber 23. In the event that an excess gas pressure is built up in the motor chamber, such as is unable to be instantaneously exhausted through the nozzle chamber in its normal position, the exhaust pressure reacts against the inner end portion 31 of the nozzle 22, thereby forcing it rearwardly against the inward reaction of the spring 28. If the proper spring tension is selected, movement of the nozzle may be controlled so that the flow of exhaust gas results in a substantially constant pressure within the motor tube. This is due to the fact that the effective throat area between the nozzle and the tapered cone is increased when the nozzle moves outwardly against the resistance of the spring. Thus, it will be seen that as the pressure in the motor chamber is increased, the effective nozzle area is likewise increased. Conversely, when the pressure within the motor chamber is decreased the nozzle is moved forward by the expansion of the spring, thereby decreasing the effective nozzle area.

It will be understood that by proper selection of spring tension and taper of the cone, the variable throat rocket nozzle of the present invention may be so arranged that the initial compression caused by ignition of the propellent grain will not be released until the temperature within the rocket motor has reached a predetermined value, whereupon the nozzle will tend to compensate for changes in pressure in the gas chamber and thereby maintain a predetermined value of gas pressure. In this manner it is apparent that the gas pressure at the nozzle end of the motor tube acts on the exposed annulus of the nozzle and compresses the spring until there is equilibrium between the spring and the gas pressure. Rearward movement of the nozzle causes the effective throat area to increase as the nozzle moves with respect to the tapered cone, and conversely, when the spring pressure is greater than the gas pressure, the nozzle is forced inwardly thereby reducing the effective throat area.

In a modified form the variable throat rocket nozzle of the present invention may be constructed so that the central cone is slidably mounted and the rocket nozzle is fixed within the nozzle housing. Referring to the construction shown in Fig. 4, the elements are designated by reference characters numbered 100 digits higher than like parts in Figs. 1, 2 and 3. In this modification the nozzle housing 112 is mounted in the motor tube 111 by means of an internal screw thread arrangement 114. A stationary grain support grid 40 having exhaust apertures 41 is mounted by screw thread arrangement 42 in the motor tube in order to position the propellent grain 113. A movable grid 115 is positioned in the motor tube between the grid 40 and the spring 128 and has mounted thereon by screw thread arrangement 118 a regulator cone 117 having an invertedly tapered end portion 119 which projects into the nozzle chamber 123. A helical spring 128 is positioned in the spring chamber 120 and bears against the exhaust side of the spider 115 and the inner end annulus 131 of the nozzle 122. The nozzle is provided with an external flange 126 which is mounted in an annular recess in the exhaust end of the nozzle housing 112 and fixed in this position by means of a centering ring 121 which is screw threaded into the inner end portion of the nozzle housing.

In normal position before ignition of the propellent grain, the spring 128 is expanded and maintains the movable spider 115 snugly against the fixed abutment grid 40. The minimum effective throat area between the nozzle 122 and the inverted tapered cone portion 119 is obtained in this position. After the propellent grain has been ignited and the gas pressure in the motor tube chamber 129 reaches a sufficient value, it is exhausted through the ports 41 of the fixed abutment spider and the ports 130 of the movable spider 115 and passes outwardly through the spring chamber 120 and further outwardly through the effective throat area between the minimum diameter portion of the nozzle chamber 123 and the maximum portion of the inverted tapered cone 119. If a spring having the desired resistance to compression and a cone having the desired form of inverted end portion are selected, the spring may be compressed and expanded depending upon the maximum or minimum value of the pressure present in the motor tube chamber until equilibrium has been established between the spring compression and the gas pressure. Thus, depending upon the gas pressure in the chamber 129, the compressibility of the spring 128 and the degree of taper of the inverted cone 119, the movable spider 115 may be rearwardly moved from its normal position as shown to a position where it engages the shoulder 116 of the nozzle housing as shown by the dotted lines. It will be apparent that as the inverted cone portion moves outwardly into the nozzle chamber, the effective throat area is increased to permit the flow of a greater volume of gas. Conversely when the inverted cone portion is moved inwardly and away from the nozzle chamber by expansion of the spring, the effective throat area is decreased thereby tending to maintain a constant gas pressure within the motor tube chamber.

We claim:

In a rocket-propelled device having a propelling charge and a motor tube containing said charge, said tube having an exhaust end, a grid fixed in the motor tube adjacent to but spaced inwardly from said end, a regulator cone mounted on the grid being located axially of the motor tube and including a tapered portion extending outwardly beyond the exhaust end, a nozzle housing attached to the tube in the space between its exhaust end and the grid to abut the grid, said nozzle being counterbored to form a shoulder and part of a spring chamber, a nozzle tube operable in the housing, completing the spring chamber, said nozzle tube having a Venturi bore occupied by the tapered portion of the regulator cone and having a flange engageable with the nozzle housing shoulder, a spring in the chamber pressing on the flange, and a ring carried by the nozzle housing, centering the nozzle tube and providing an abutment for the spring.

FRANKLIN E. ROACH.
O. EVANS DUEMLER.

REFERENCES CITED

The following references are of record in the file of this patent:

UNITED STATES PATENTS

| Number | Name | Date |
|---|---|---|
| 1,901,852 | Stolfa et al. | Mar. 14, 1933 |

FOREIGN PATENTS

| Number | Country | Date |
|---|---|---|
| 523,468 | Great Britain | July 15, 1940 |